Inventor:

By [signature]
His Attorney

April 17, 1962

E. MERTEN

PHOTOGRAPHIC PRINTING APPARATUS FOR SEISMIC AND OTHER RECORDS

Re. 25,160

Original Filed Sept. 30, 1952

5 Sheets-Sheet 2

Inventor:
Eugen Merten
By
His Attorney

Inventor:
By H. Wilkinson
His Attorney

Inventor:
By
His Attorney

Inventor:
Eugen Merten
By
His Attorney

United States Patent Office

Re. 25,160
Reissued Apr. 17, 1962

25,160

PHOTOGRAPHIC PRINTING APPARATUS FOR SEISMIC AND OTHER RECORDS

Eugen Merten, Houston, Tex., assignor to Shell Development Company, Emeryville, Calif., a corporation of Delaware Original No. 2,821,892, dated Feb. 4, 1958, Ser. No. 312,266, Sept. 30, 1952. Application for reissue Feb. 16, 1959, Ser. No. 793,653
5 Claims. (Cl. 95—73)

Matter enclosed in heavy brackets [ ] appears in the original patent but forms no part of this reissue specification; matter printed in italics indicates the additions made by reissue.

This invention pertains primarily to seismic exploration, and relates to an improved type of exploratory seismic records or seismograms, and to a method and apparatus for forming such records.

It is, however, understood that said method and apparatus are not limited to the production or reproduction of seismic records only, but may be used in forming or reproducing photographic and other records of any type, especially when it is desired to change said records to a different or variable scale, as will appear hereinbelow. For purposes of clearness, however, and because of the fact that the present method and apparatus find a particularly advantageous application in seismic work, said method and apparatus will be described and illustrated with regard to their use in producing seismic records.

Depending on the recording method used, seismograms obtained in seismic work may be of the variable amplitude or variable area type, wherein the record is produced in the form of an oscillatory line whose amplitude of oscillations or "squiggles" is proportional to the intensity of the electric impulses, or of the variable density type, in which the record is produced in the form of a track wherein the density of the light image is proportional to the intensity of said impulses.

Neither the variable amplitude nor the variable density records, however, even when obtained in accordance with a method of exploration such, for example, as the continuous profiling method, and subsequently properly arranged and grouped, are capable of giving a sufficiently clear picture permitting an observer to visualize by inspection the underground conditions of the area under survey.

It is a general object of this invention to provide a method and apparatus whereby a record of any type may be reproduced to a different scale susceptible to make said record easier for reading, interpretation or correlation purposes.

It is also an object of this invention to provide a method and apparatus whereby a record may be reproduced to any desired size, the scale at which the reproduction is effected being varied during the very process of reproduction, as will appear hereinbelow.

It is a particular object of this invention to provide, as a visual aid in seismic exploration, an improved type of seismic record adapted to simplify seismic interpretation and correlation, and a method and apparatus for producing such records.

It is also an object of this invention to provide a method and an apparatus by means of which variable amplitude, variable area or variable density type seismic records made directly in the field, or obtained in the laboratory from such field records, can be grouped, modified and displayed so as to give a clear composite visual picture of the nature and arrangement of underground strata.

It is also an object of this invention to provide a method and an apparatus whereby said composite seismic picture is automatically reduced at the time of the formation thereof to a suitable and consistent horizontal scale, is given a proper weathering correction, and is automatically changed from a vertical reflection-time scale to a correct vertical distance scale, thereby minimizing chances of error on record inspection.

These and other objects of this invention will be understood from the following description taken with reference to the attached drawings, wherein.

As well known to those familiar with seismic surveying and as more particularly described in my co-pending application Serial No. 217,541, filed March 26, 1951, now Patent No. 2,710,070, issued June 7, 1955, conventional seismic profiling work is carried out by disposing, along a preferably straight line and in contact with the ground, a spread of a plurality of seismometers or detectors, of which one-half may be located to one side of the shot point, and the other half to the other side thereof, the total distance occupied by the spread being of the order of from 1000 to 4000 feet.

A recording unit is electrically connected to the detectors to amplify and record in well-known fashion the electrical impulses produced by the detectors upon the arrival thereto of seismic waves generated by the explosion at the shot point and reflected or refracted by the various underground formations.

After an explosion has been recorded, the detectors and the recording unit are moved further along the original profiling line and another shot is exploded at a second shot point along said line. After the second shot has been recorded, the same operations are repeated at a third and any desired number of further points, a continuous profiling of underground formations being thus effected along a survey line extending any desired number of feet or miles.

As mentioned hereinabove, the type of record obtained at the recording unit may be either of the variable-amplitude type, wherein the vibration of the movable element of the detector in response to ground waves is represented by a line having a variable amplitude of oscillation, or of the variable area type, wherein the areas to the two sides of the variable amplitude oscillating line appear in contrasting, usually black and white, colors.

Should records of the variable amplitude type be obtained in the field, they can be readily converted to contrasting variable-area records by any suitable method, such for example as applying by hand black ink to the record to one side of the oscillating line photographically produced there. However, should it be desired to obtain contrasting variable area seismic records directly in the field, this can be readily achieved by means of any suitable method and equipment such, for example, as described in my above-mentioned patent application Serial No. 217,541, which method, forming no part of the present invention, will not be further described here.

In any case, records of the variable amplitude, variable area, variable density or for that matter, of any other desired type, can all be used as suitable material in practicing the method of the present invention, as will appear from the description hereinbelow.

Figure 1:
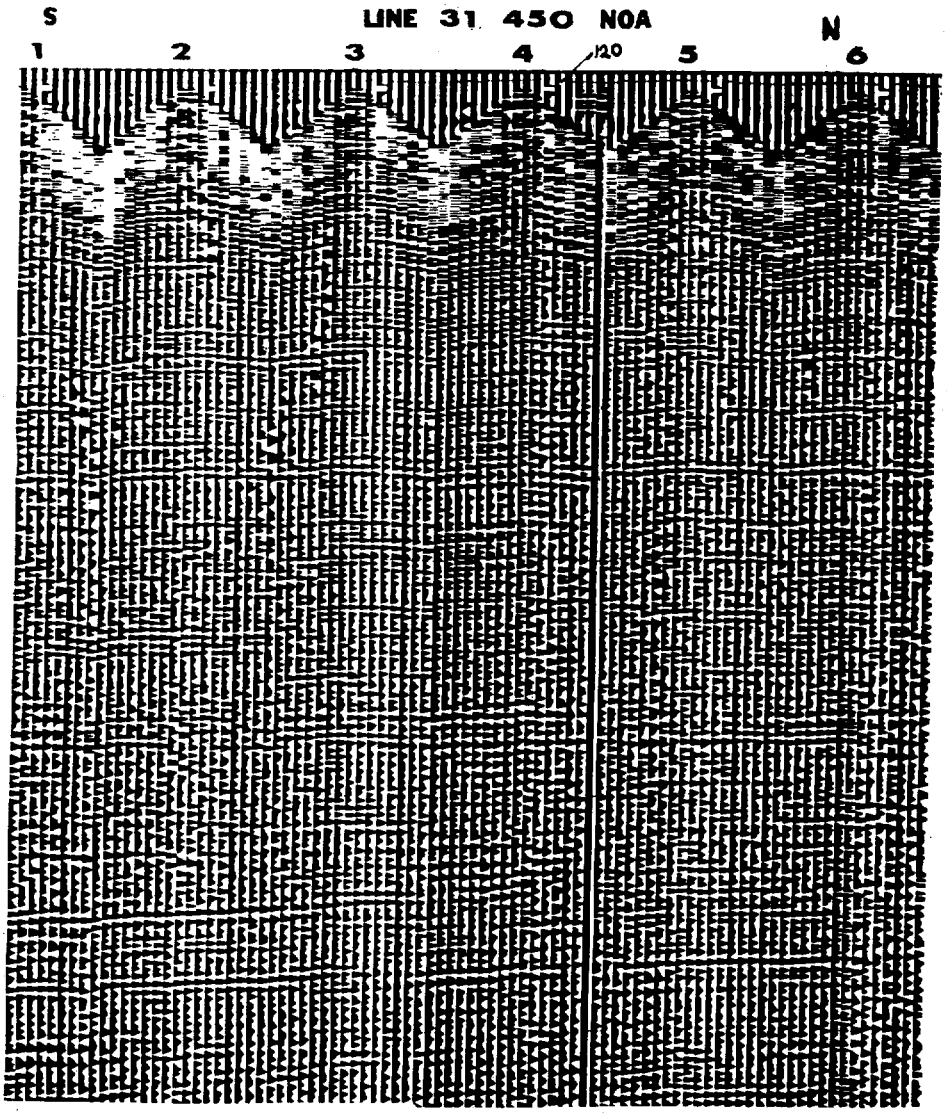
FIG. 1 shows the initial stage of a composite seismogram of the present invention.

Referring to the drawings, FIG. 1 illustrates a composite seismogram comprising a plurality of variable area records obtained along a profiling line extending from south to north, as generally indicated by the letters S—N at the top of the record. The several multi-trace seismograms, obtained as outlined above by exploding successive charges at shot points 1, 2, 3, 4, 5 and 6, arranged side by side in proper order and photographically reduced to a suitable size to form the single print or photograph of FIG. 1. It will be seen that the area of FIG. 1 actually gives a cross-section view of the ground along a vertical plane passing through the profiling line S—N. The various formation layers, and the interfaces therebetween, where the seismic waves traveling from the shot points are partially reflected and partially refracted, are shown in the composite seismogram of FIG. 1 as oscillations appearing along approximately horizontal lines across the successive traces forming said seismogram.

However, although the composite seismogram of FIG. 1 permits, to a certain degree, to visualize an inspection the underground conditions or stratification along the profiling line, such picture lacks the accuracy, continuity and clarity, required for instant visualization of underground conditions. This is due to several causes and may be corrected as follows in accordance with the present invention.

First, the dimensions of the composite seismogram in the horizontal direction should be made to a uniform scale, and said scale should preferably be reduced or compressed as compared with the vertical scale. As stated above, the composite seismogram is formed by arranging side by side a plurality of individual seismograms obtained from a series seismometer spreads disposed along a profiling line. These individual seismograms, being made by standard equipment on standard photographic paper, are necessarily of the same width, whereas the actual seismometer spreads to which they correspond may differ from each other longitudinally (along line S—N) by as much as 2000 feet. Thus, for example, if the distance between shot points 2 and 3 is 3000 feet, while that between shot points 3 and 4 is 2000 feet, the spacing between points 2 and 3 in FIG. 1 should be equal to one and a half times the spacing between points 3 and 4 instead of being equal thereto.

Second, the vertical scale of the composite seismogram must be corrected for two principal errors; the increase of seismic wave travel velocity with increasing depth, and the effect of the weathered layer. It will be realized that the vertical scale of the composite seismogram of FIG. 1 is in fact a time scale, wherein equal vertical linear spacings correspond to equal times or periods of seismic wave travel rather than to equal actual vertical distances traveled through during said periods. Since the speed of seismic wave travel is considerably greater at greater depths, the use of a vertical time scale results in a distortion which it is one of the objects of the present invention to eliminate by automatically converting said time scale to a proper distance or depth scale. Likewise, the wave travel velocity in the upper or weathered layer being considerably less than in consolidated layers, the actual thickness of said weathered layer at the location of each seismometer spread affects the total time necessary for the reflections to reach the seismometers, and thus may bring into the composite seismogram another inaccuracy which it is likewise the object of this invention to eliminate.

Figure 2:
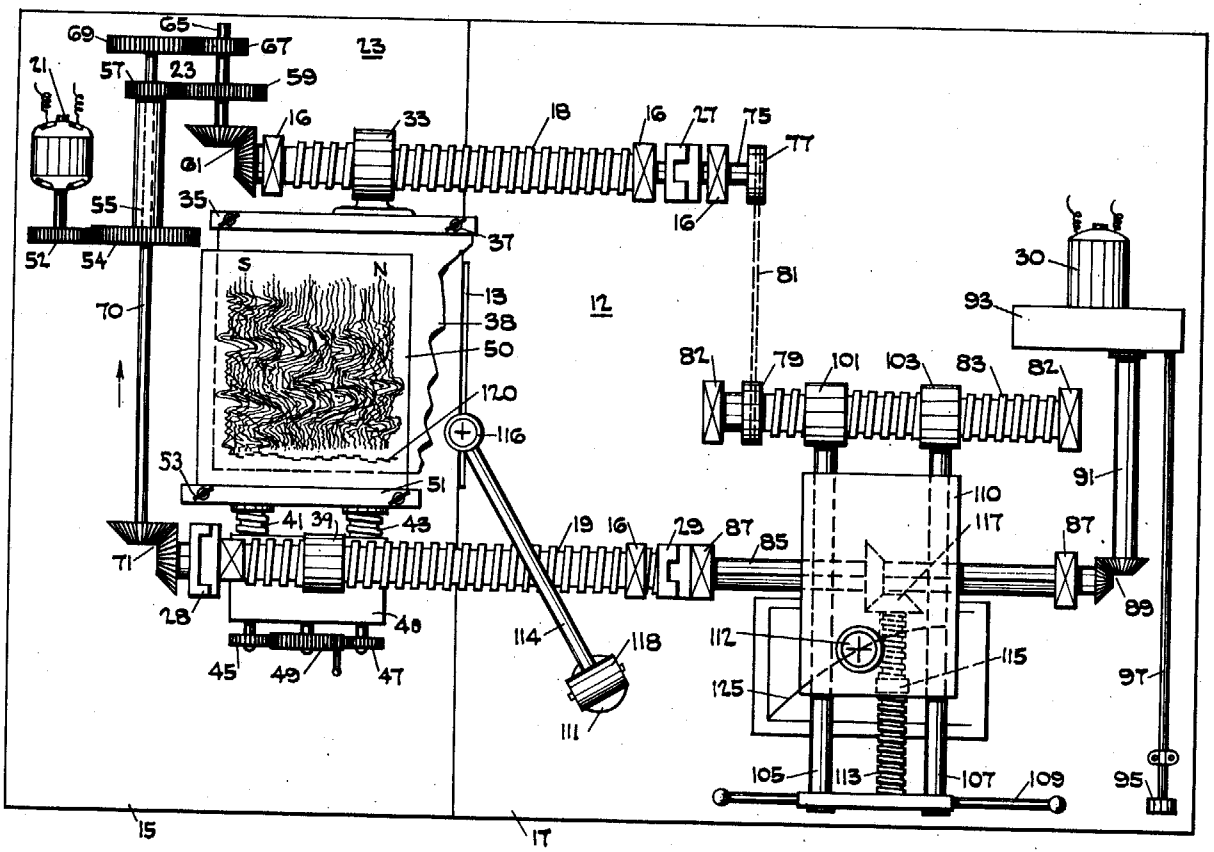
FIG. 2 is a diagrammatic plan view of an embodiment of the apparatus of the present invention.

FIG. 2 shows a plan view of an arrangement used in carrying out the method of the present invention. This comprises a horizontal table 12 having a narrow transverse slot 13. If desired, table 12 may be made of two portions 15 and 17 movable with regard to each other. By telescoping portions 15 and 17, the widths of the slot 13 may be varied between limits such as .1 and .001 of an inch. A source of light, located under the table 12 and therefore not shown in FIG. 2, projects light beams vertically upwards through the slot 13, which serves thus as the objective lens of the photographic system of the present invention.

Rotatably supported on the table 12 on bearings 16 are two parallel horizontal leads screws 18 and 19 driven by a motor 21 through a gear train generally denoted by the numeral 23. The lead screws 18 and 19 are provided with clutches 27, 28 and 29 by means of which screws 19 can be disconnected from motor 21 and connected for operation to motor 30, as will appear hereinbelow.

Mounted for axial motion along the lead screw 18 is a traveling nut 33, supporting a bracket 35 provided with locking means 37 for clamping therein a film or sheet, such as a sheet of sensitized photographic paper 38.

Mounted for axial motion along the lead screw 19 is a traveling nut 39 supporting a carriage 40. Mounted in carriage 40 at right angles to lead screw 19 are two smaller lead screws 41 and 43 actuated for axial movement at right angles to the axis of lead screw 19 by means of rotation through driven gears 45 and 47 and a hand-operated driver gear 49. The movable lead screws 41 and 43 carry attached thereto a bracket 51 provided with locking means 53 for clamping therein a sheet, such for example as a seismogram 50 of the type shown in FIG. 1.

Any suitable gear train whereby the speed of one of the lead screws may be varied with regard to the other may be used for the purposes of this invention, and the gear train 23 illustrated in FIG. 2 is therefore shown merely by way of example. It will be readily seen from the drawing that the constant-speed motor 21 drives the lead screw 18 through the gears 52 and 54, sleeve 55, gears 57 and 59 and bevel gears 61, gears 54 and 57 being fixedly mounted on and rotating with the sleeve 55, and gears 59 and 61 being fixedly mounted on and rotating with shaft 65. At the same time, the lead screw 19 is driven by the motor 21 through gears 52 and 54, 57 and 59, 67 and 69, shaft 70 and bevel gears 71, the shaft 70, having the gear 69 fixedly attached thereto, passing slidably through the sleeve 55 and gears 54 and 57. Gears 67 and 69 are interchangeable gears, so that by selecting a proper gear ratio, the lead screw 19 may be given any desired speed ratio with regard to the lead screw 18: for example, speed ratios of from 1:1 to 1:12 may be readily used.

It is understood that in operating the apparatus of FIG. 2 as described above the clutch 28 is engaged, and the clutches 27 and 29 disengaged. Should it be desired not only to run the lead screw 19 at a speed different from that of lead screw 18, but also to run it at a variable speed while retaining the speed of the lead screw 18 constant, this may be achieved by disengaging the clutch 28 and engaging the clutches 27 and 29. It will be seen that in such case, the constant speed motor 21 will continue to drive the lead screw 18 at a constant speed and will also drive, through the clutch 27, shaft 75 and sprockets 77 and 79, connected by a chain 81, a horizontal lead screw 83, parallel to lead screws 18 and 19 and suitably supported on the table 12 between bearings 82, while the lead screw 19 will be driven, through clutch 29, a shaft 85 (supported between bearings 87), bevel gears 89 and power shaft 91, by an electric motor 30, which may be either a variable speed motor having its speed controlled electrically in a fashion well known in the art, or a constant speed motor coupled to the shaft 91 through a variable speed gear box, whereby the rotational speed of shaft 91, and therefore of the lead screw 19, can be varied mechanically by means of a control knob 95 and rod 97.

Mounted for axial motion along the lead screw 83 are traveling nuts 101 and 103. Horizontal bars 105 and 107, each having one end affixed to one of said nuts and the other end supported on a rail 109 for motion therealong, serve to support a carriage platform 110 carrying a telescope or other sighting device 112. The platform 110, which is movable with traveling nuts 101 and 103 axially of the lead screw 83, is also movable in a direction perpendicular thereto along bars 105 and 107 by means such as a lead screw 113, a split nut 115 attached to the platform 110, and meshing bevel gears 117, one of which is attached to the lead screw 113 and the other splined to the shaft 85 for rotation with said shaft and axial motion therealong. It will be seen that with the arrangement described, the platform 110 may be made to move axially of the lead screw 83 by the constant speed motor 21 at the same speed as the bracket 35 along lead screw 18, while at the same time being moved in a direction perpendicular thereto by the variable speed motor 30 at the particular speed used at any given moment to move the bracket 51 along the lead screw 19.

In operating the system of FIG. 2, a transparent negative of a composite seismogram 50, which may be of the variable density, variable amplitude or variable area type, such for example as shown in FIG. 1, is clamped to the bracket 51 by means of the locking screw 53, while a piece of sensitized paper or film is clamped to the bracket 35 by means of the locking screw 37, suitable precautions being taken against exposure to light.

A desired speed ratio between the lead screws 18 and 19 is then provided by selecting gears 67 and 69 having the desired tooth ratio. Thus, for example, if it is desired to reduce the horizontal scale of the seismogram of FIG. 1 by half, the lead screw 19 is given twice the speed of lead screw 18 by selecting a gear 67 having a tooth ratio of 2:1 with regard to gear 69.

If, during the process, it becomes desirable to change the ratio of the spacings between the stations 1, 2, 3, etc., this can be readily achieved by stopping, at appropriate moments, the apparatus, replacing the gears 67 and 69 previously used by other gears having the desired tooth ratio, and resuming the operations.

At the same time, means are provided for and measures are taken to effect the weathered layer correction when making the seismogram forming the next stage of development of the seismogram of FIG. 1 according to the present method.

A base 111 is provided on the table 12 carrying a hinged support 118, rotatable about the vertical axis of said base. A bracket arm 114 is attached to the support 118, being rotatable about the horizontal axis of said support. A telescope or other suitable sighting device 116, mounted in a universal joint in a normally vertical position at the end of the arm 114, can thus be brought to bear on substantially any desired point of the seismogram 50 as it travels along the lead screw 19.

The seismogram 50, which is that shown in FIG. 1, is provided with a correction line 120, which is marked thereon, in any desired manner well known to seismologists, from information available to them from various sources about the distribution and the thickness of the weathered layer in the region under exploration and particularly along the line designated herein as S—N.

Thus, as the seismogram 50 and the sensitized paper 38 advance to the right at their respective speeds over the lighted slot 13, the operator brings the vertical telescope 116 to bear on the line 120, and causes said line to remain under the cross-hair of the telescope by operating the wheel 49 so as to move the bracket 51, carrying the seismogram 50, at right angles to its motion along the lead screw 19. As a result, the seismogram 50 is displaced with regard to the sensitized paper 38, and the weathered layer correction is automatically brought into the next record.

Figure 3:
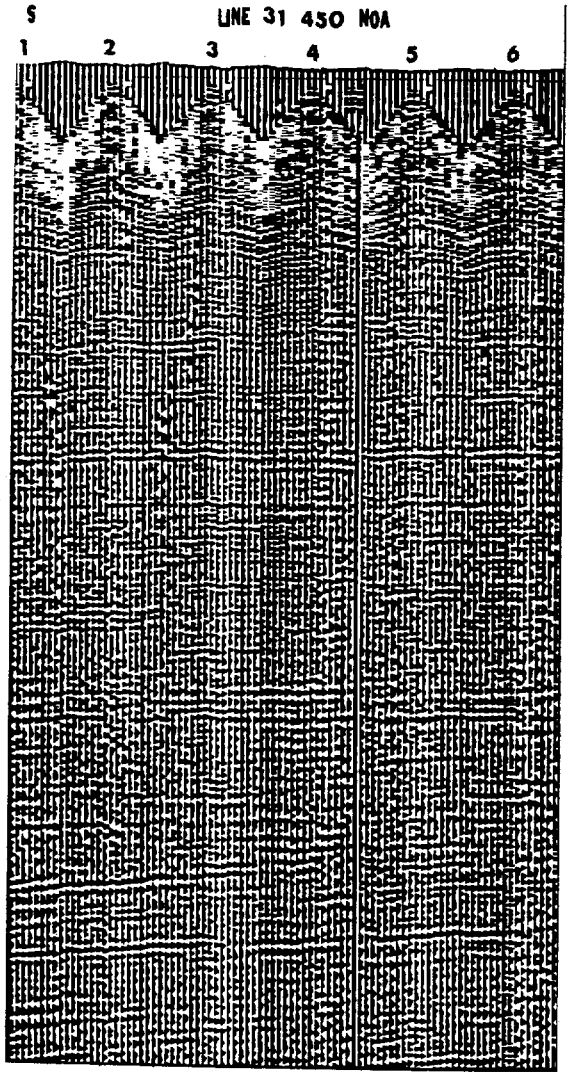

It will be seen that this new record, which is shown in FIG. 3, differs from that of FIG. 1 in that its horizontal scale is reduced to a fraction of that of FIG. 1, and in that it has been corrected for the weathered layer. Thus, it will be seen that the top border of the seismogram, appearing as a straight black line under the numerals 1, 2, 3, 4, 5, 6 in FIG. 1, appears in FIG. 3 as a broken line, whereas the weathered layer correction line 120, appearing as a broken line in FIG. 1, appears as a substantially straight line in FIG. 3. In this manner, discrepancies in the time of arrival of reflections due to the effect of the weathered layer at the locations of the successive shots are eliminated from the seismogram of FIG. 3.

The next step in the present method, after obtaining the seismogram of FIG. 3, is to correct it for vertical scale distortion.

Figure 4:
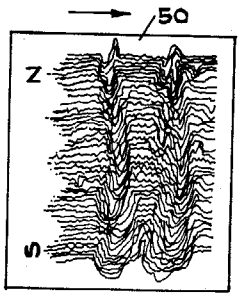
FIGS. 3 and 4 show intermediate stages of a composite seismogram of the present invention.

For this purpose, the negative of the seismogram of FIG. 3 is clamped in the bracket 51, but in a position at right angles to that in which the seismogram of FIG. 1 was held previously: that is, in the position shown in the diagram of FIG. 4, the line S—N of the seismogram being now disposed at right angles to the direction of travel of said seismogram.

The clutch 28 is at this time disengaged, and the clutches 27 and 29 engaged, so that the lead screw 19 is driven by the variable speed motor 30 as described before, while the lead screw 83 is driven by the constant speed motor 21 through sprockets 77 and 79 and chain 81.

Figure 5:
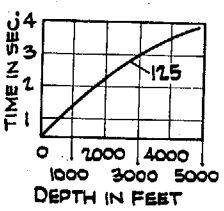
FIG. 5 is a diagrammatic representation of a time-depth graph used in correcting the vertical scale of the present seismograms.

To correct the distortion of the vertical scale of the seismograms of FIGS. 1 and 3, use is made of a graph such as shown in FIG. 5, wherein the depth-time of travel curve 125 indicates the rate of gradual increase of seismic velocities with depth. Curve 125 is plotted from information available to seismologists regarding the location under survey from sources such as special vertical velocity measurements in wells, data from previous seismic surveys, etc.

Figure 6:
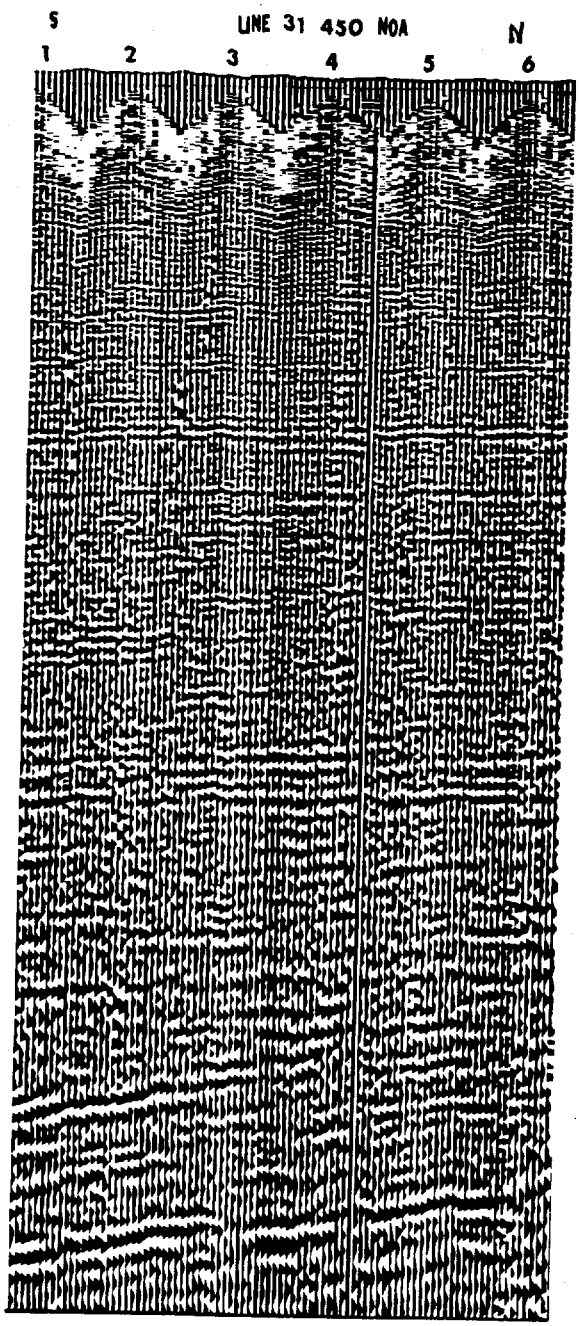
FIG. 6 shows the final stage of a composite seismogram of the present invention.

The graph of FIG. 5 is positioned on the table 12 under the carriage 110, and the cross-hair of the sighting device 112 is brought to bear on the curve 125. The constant speed motor 21 is started, the variable speed motor 30 being started at the same time and at such speed that the traveling nuts 33 and 34 move along the lead screws 18 and 19, respectively, at the same speed. The constant-speed rotation of the lead screw 18 is transmitted, through chain 81, to the lead screw 83. As the traveling nuts 101 and 103, together with the carriage 91 supported on lead screws 88 and 89, begin to move in the same direction and at the same speed as the traveling nuts 33 and 39, the operator maintains the cross-hair of sighting device 93 on the curve 125 by changing the speed of the power shaft 91 by a suitable manipulation of the control knob 95, thereby changing the ratio between the speed of the platform 110 axially of the lead screw 83 and its speed at right angles thereto. Since a change in the speed of the power shaft 91 results in a change of speed of the lead screw 19, the clamp 51 and the seismogram 50 (carried thereby in the position shown in FIG. 4) begin also to travel at a different rate than the clamp 35 and the sensitized paper carried thereby, with the result that the seismogram obtained in this operation, shown in FIG. 6, has its vertical scale altered as a function of the curve 125, that is, has a vertical scale measured in true units of depth, and not a scale measured in units of time. As stated above, the time scale is incorrect since seismic velocities, or distances traveled through per unit time, are not constant, but increase with depth. The final seismogram shown in FIG. 6, gives therefore a much clearer and more correct picture of the true geometry of underground layers than do FIGS. 1 or 3 showing the initial and the intermediate stages of the seismograms of the present method.

It will be understood that FIG. 2 illustrates only one embodiment of apparatus suitable to carry out the present method, and that said apparatus may be modified in various respects without departing from the spirit of the present invention.

Figure 7:
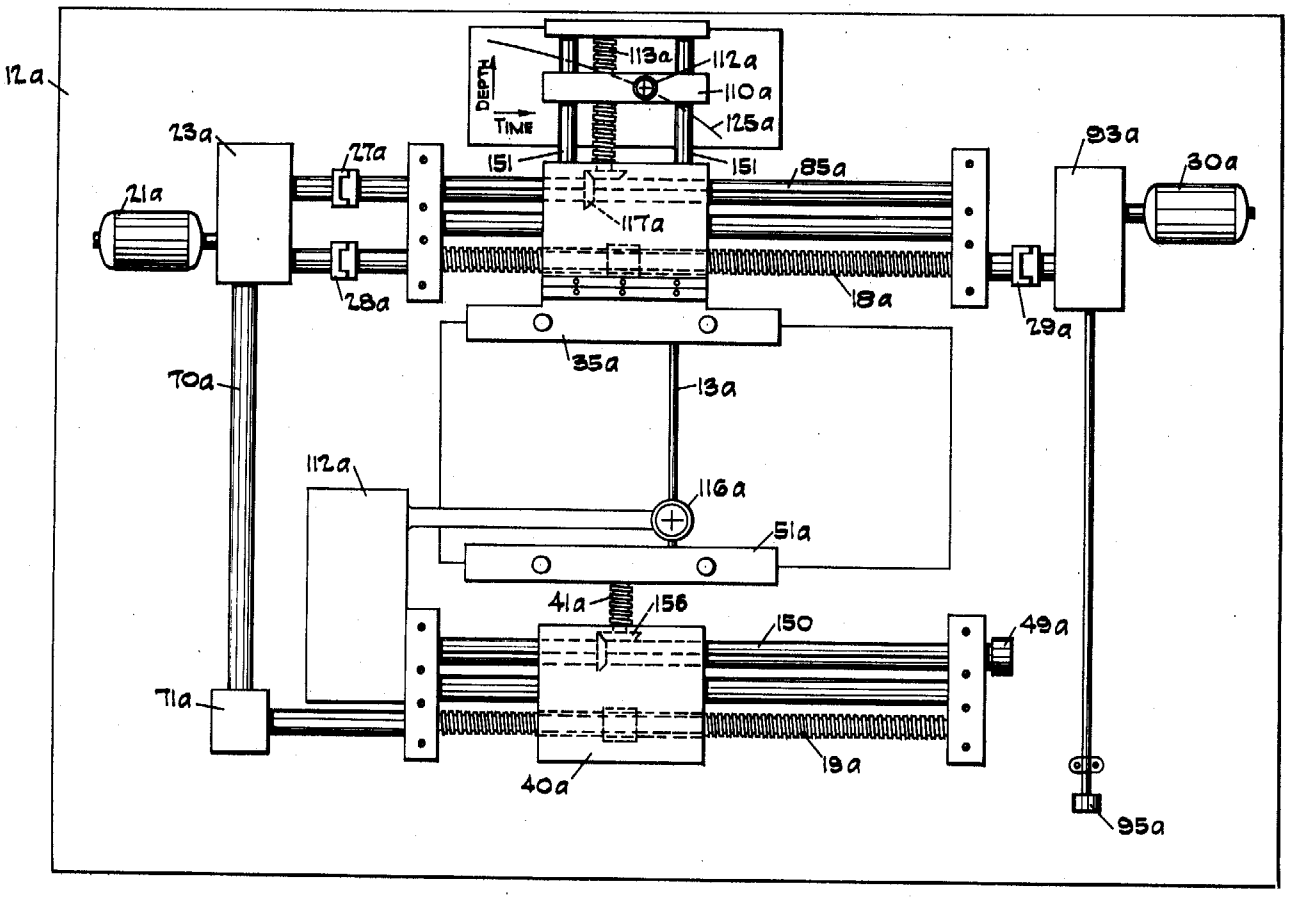
FIG. 7 is a plan view of another embodiment of the present invention.

A modified and improved embodiment of the apparatus of the present invention is shown in FIG. 7, wherein elements identical or similar in structure or function to those of FIG. 2 are denoted by the same numerals followed by the letter "a."

In the embodiment of FIG. 7, the constant speed motor 21a drives, through a gear box 23a and a clutch 28a, a lead screw 18a. It likewise drives, through a clutch 27a, splined shaft 85a, meshing bevel gears 117a and a lead screw 113a, a carriage or platform 110a moving on supporting rods 151 and carrying a sighting device 112a scanning the depth-time curve 125a. The motor 21a also drives, through a shaft 70a, gear box 71a, and second lead screw 19a, a carriage or platform 40a. A bracket 51a is attached to the platform 40a and moves with said platform longitudinally of the lead screw 19, while a motion perpendicular thereto may be imparted to said bracket by operating a knob 49a to rotate a splined shaft 150, bevel gears 156 and a lead screw 41a.

A variable speed motor 30a (or a constant speed motor having a variable speed changer 93a) is likewise connectable to drive the lead screw 18a by engaging clutch 29a, clutch 28a being at that time disengaged.

The operation of the system of FIG. 7 will be clear from the above description of the system, said operation being furthermore similar to that of the system of FIG. 5.

Thus, when adjusting the horizontal scale of the seismograms, clutches 27a and 29a and the variable speed motor 30a are disconnected. The negative (or original transparent seismogram) is clamped in the bracket 51a, while a photo-sensitized sheet is clamped in the bracket 35a. The shafts 18a and 19a are then run at constant different speeds by the motor 21a through the gear box 23a, as already explained with regard to FIG. 2, changes of speed ratios being effected, if desired, by changing the gear ratios in the box 71a at suitable intervals, and the weathering correction being applied by manipulating the knob 49a.

When adjusting or converting the vertical scale to a true depth or distance scale from a time scale, the clutch 28a is disengaged and clutches 27a and 29a engaged. The negative (or original transparent seismogram) is rotated through 90 degrees to its former position and is clamped to the bracket 35a, which is run axially of the lead screw 18a by the variable speed motor 30a, and at right angles thereto by the constant speed motor 21a through the spline shaft 85a, the operator scanning the time-depth curve 125a and maintaining the sighting device 116a thereon by regulating the speed of the shaft 18a by manipulating the knob 95a. The photo-sensitized sheet is at this time clamped to the bracket 51a, which is run by the constant-speed motor 21a. It is understood that although the carriage 110a has been shown for simplicity as moving in a plane parallel to base 12a, it may sometimes be found more convenient to arrange it in a plane vertical thereto.

It will be appreciated that the apparatus of FIG. 7, being more flexible and compact than that of FIG. 2, and eliminating certain of the elements thereof, such as the third lead screw 83 without the loss of its function, forms a preferred embodiment of the present invention.

I claim as my invention:

1. Apparatus for forming seismograms comprising a base, at least two track means parallel to each other supported on said base, carriage means mounted on each of said track means, prime mover means geared thereto for moving said carriage means longitudinally of said track means, clamping means carried by two of said carriage means, one of said clamping means being adapted to hold a seismogram sheet said sheet having superimposed thereon a plotted graph of weathered layer depth variations, and the other being adapted to hold a photo-sensitized sheet, said sheets being held in adjacent planes parallel to each other, a slot in said base extending across the path traversed by said sheets during the motion of said carriage means, means for illuminating said sheets through said slot, a sighting device supported on said base and control means for maintaining said sighting device trained on said plotted graph during the motion of the carriage means, said control means being geared to one of said carriage means to move said carriage means at right angles to its longitudinal motion upon a resetting of said control means.

2. Apparatus for forming seismograms comprising a base, at least two track means parallel to each other supported on said base, carriage means mounted on each of said track means for longitudinal motion thereon, a constant speed motor, a variable speed motor, clutch means selectively connecting one of the carriage means to either of said two motors, transmission means connecting another of the carriage means to the constant speed motor a graph of the variations in the speed of seismic waves with a depth affixed to said base, a sighting device movably supported on one of the carriage means, means actuated by the constant speed motor for moving said sighting device parallel to said track means, means actuated by the variable speed motor for moving said sighting device at right angles to said track means, clamping means carried by two of said carriage means, one of said clamping means being adapted to hold a seismogram sheet and the other being adapted to hold a photo-sensitized sheet, said sheets being held in adjacent planes parallel to each other, a slot in said base extending between said track means across the path traversed by said sheets during the motion of said carriage means, means for illuminating said sheets through said slot, and speed control means connected to the variable speed motor for maintaining said sighting device trained on said graph by varying the speed of said variable speed motor when said clutch means are engaged to drive the carriage means of the photo-sensitized sheet by the constant speed motor and the carriage means of the sighting device by the variable speed motor.

3. Apparatus for forming composite seismograms, said apparatus comprising a base, track means arranged on said base, carriage means each mounted on one of said track means, prime mover means geared thereto for moving said carriage means longitudinally of said track means, a seismogram sheet clamped to one of said carriage means, a photo-sensitized sheet clamped to a second carriage means, said sheets being held in adjacent planes parallel to each other, a slot in said base across the path of motion of said carriage means, means for illuminating said sheets through said slot, two graphs each plotting a variable seismic property of the ground, one of said graphs being carried by the base and the other by one of the carriage means, two sighting devices for scanning said graphs, one of said devices being attached to one of the carriage means and the other to the base, first control means for keeping one of said sighting devices trained on one of said graphs during the motion of the carriage means, said first control means being connected to one of the carriage means to displace said carriage means with regard to the other carriage means transversely to its longitudinal motion by an amount proportional to the amount of adjustment of said control means required to keep said sighting device trained on its graph, and second control means for keeping the second sighting device trained on the other graph during the motion of the carriage means, said second control means being connected to said prime mover means for varying the speed of the relative longitudinal motion of said first and second carriage means by an amount proportional to the amount of adjustment of said second control means required to keep said second sighting device trained on its graph.

4. Apparatus for forming composite seismograms, said apparatus comprising a base, carriage means mounted for motion on said base, prime mover means geared thereto for moving said carriage means, means for clamping a seismogram sheet to one of said carriage means and a photo-sensitized sheet to another carriage means, said sheets being positioned adjacent to each other, light source means for illuminating said sheets substantially in a single plane perpendicular thereto, graph means showing a seismic properly of the ground, sighting means for scanning said graph means, one of said means being affixed to a carriage means and the other to the base, and control means for keeping said sighting means trained on said graph means during the motion of said carriage means, said control means being linked to said carriage means for controlling the motion of said carriage means with regard to each other and to the base proportionally to the adjustments of said control means required to keep said sighting means trained on said graph means.

*5. Means to reproduce a seismic trace recorded in increments of time to a reproduction in increments of depth, including a holder for a record showing seismic events in equal time intervals, a scanner to traverse a record in said holder, a recorder of events scanned by said scanner, drive means imparting relative travel between said holder and said scanner and drive means imparting relative travel between said scanner and said recorder at a rate different from the relative travel rate imparted by the first mentioned drive means, the difference in rates being according to a predetermined pattern dictated by known velocity change applicable to the particular record.*

References Cited in the file of this patent or the original patent

UNITED STATES PATENTS

| | | |
|---|---|---|
| 1,007,760 | Williams | Nov. 7, 1911 |
| 1,176,384 | Lotka | Mar. 21, 1916 |
| 1,844,162 | Hirsch et al. | Feb. 9, 1932 |
| 1,906,973 | Kingsbury | May 2, 1933 |
| 2,018,200 | Crudo | Oct. 22, 1935 |
| 2,147,532 | Johnson | Feb. 14, 1939 |
| 2,276,423 | Silverman | Mar. 17, 1942 |
| 2,440,971 | Palmer | May 4, 1948 |
| 2,604,955 | Hawkins | May 29, 1952 |
| 2,617,337 | Snyder | Nov. 11, 1952 |
| 2,710,070 | Mertin | June 7, 1955 |
| 2,710,661 | Webster | June 14, 1955 |

FOREIGN PATENTS

| | | |
|---|---|---|
| 417,645 | Great Britain | Oct. 1, 1934 |
| 775,516 | France | Oct. 15, 1934 |
| 430,995 | Great Britain | June 28, 1935 |